(12) United States Patent
Li et al.

(10) Patent No.: US 8,189,100 B2
(45) Date of Patent: May 29, 2012

(54) MOBILE DEVICE WITH DUAL DIGITAL CAMERA SENSORS AND METHODS OF USING THE SAME

(75) Inventors: Hsiang-Tsun Li, San Diego, CA (US); Behnam Katibian, Irvine, CA (US); Haohong Wang, San Jose, CA (US); Sharath Manjunath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 634 days.

(21) Appl. No.: 11/493,439

(22) Filed: Jul. 25, 2006

(65) Prior Publication Data

US 2008/0024614 A1 Jan. 31, 2008

(51) Int. Cl.
*H04N 5/225* (2006.01)
*H04N 7/00* (2006.01)
*H04N 13/02* (2006.01)

(52) U.S. Cl. ......... 348/376; 348/38; 348/47; 348/218.1

(58) Field of Classification Search .................... 348/38, 348/47, 48, 218.1, 262, 264, 376
See application file for complete search history.

(56) References Cited

U.S. PATENT DOCUMENTS

| 4,751,570 | A | * | 6/1988 | Robinson | 348/47 |
| 5,142,357 | A | * | 8/1992 | Lipton et al. | 348/48 |
| 5,175,616 | A | * | 12/1992 | Milgram et al. | 348/47 |
| 5,903,303 | A | * | 5/1999 | Fukushima et al. | 348/47 |
| 7,102,686 | B1 | * | 9/2006 | Orimoto et al. | 348/375 |
| 7,190,389 | B1 | * | 3/2007 | Abe et al. | 348/42 |
| 7,397,511 | B2 | * | 7/2008 | Ezawa | 348/373 |
| 7,424,218 | B2 | * | 9/2008 | Baudisch et al. | 396/322 |
| 2005/0046740 | A1 | | 3/2005 | Davis | |
| 2006/0170785 | A1 | * | 8/2006 | Mashitani et al. | 348/211.99 |
| 2007/0077056 | A1 | * | 4/2007 | Uchiumi et al. | 396/325 |
| 2008/0024596 | A1 | * | 1/2008 | Li et al. | 348/47 |

FOREIGN PATENT DOCUMENTS

| EP | 0472015 | | 2/1992 |
| GB | 2394850 | | 5/2004 |
| JP | 06105339 | A * | 4/1994 |
| JP | 11069380 | A * | 3/1999 |
| JP | 11341522 | A * | 12/1999 |
| JP | 11355624 | | 12/1999 |
| JP | 2002295445 | A * | 10/2002 |
| JP | 2003051872 | | 2/2003 |
| JP | 2004118711 | | 4/2004 |
| JP | 2004135074 | | 4/2004 |

(Continued)

OTHER PUBLICATIONS

Translation of JP 2003-051872 A.*

(Continued)

*Primary Examiner* — John Villecco
(74) *Attorney, Agent, or Firm* — Alex C. Chen; James R. Gambale, Jr.

(57) ABSTRACT

A mobile device comprising a first image sensor, a second image sensor configured to change position with respect to the first image sensor, a controller configured to control the position of the second image sensor, and an image processing module configured to process and combine images captured by the first and second image sensors.

28 Claims, 6 Drawing Sheets
(4 of 6 Drawing Sheet(s) Filed in Color)

FOREIGN PATENT DOCUMENTS

| | | | | |
|---|---|---|---|---|
| JP | 2004242092 | A | * | 8/2004 |
| JP | 2005020187 | A | * | 1/2005 |
| JP | 2005024629 | A | * | 1/2005 |
| JP | 2005080210 | A | * | 3/2005 |
| JP | 2005176284 | A | * | 6/2005 |
| JP | 2006033476 | | | 2/2006 |
| JP | 2006108883 | A | * | 4/2006 |
| JP | 2006121229 | | | 5/2006 |
| JP | 2006166148 | | | 6/2006 |
| KR | 199956674 | | | 7/1999 |
| KR | 2006011680 | A | * | 2/2006 |
| KR | 2007030501 | A | * | 3/2007 |
| KR | 2007065500 | A | | 6/2007 |
| KR | 803504 | B1 | * | 2/2008 |
| WO | 2006062027 | | | 6/2006 |

OTHER PUBLICATIONS

International Search Report—PCT/US2007/074287, International Search Authority—European Patent Office—Apr. 1, 2008.

Written Opinion—PCT/US2007/074287, International Search Authority—European Patent Office—Apr. 1, 2008.

"Mobile Handset Makers Seek to Explore Dual Camera Phone Market", Feb. 26, 2005, 1 page, http://www.textually.org/picturephoning/archives/2005/02/007310.htm.

"Nokia Launches The 6680 Dual Camera Video Phone", Mobiledia, Feb. 14, 2005, 3 pages., http://www.mobiledia.com/news125773.html.

L. Hill and A. Jacobs, "3-D Liquid Crystal Displays and Their Applications", Proc. IEEE, Mar. 2006, pp. 575-590, vol. 94, No. 3.

J. Son, B. Javidi, and K. Kwack, "Methods for displaying three-dimensional images", Proc. IEEE, pp. 502-523, vol. 94, No. 3, Mar. 2006.

D. L. Milgram, "Computer methods for creating photomosaics", IEEE Trans. Computers, C-24(11):1113-1119, Nov. 1975.

International Preliminiary Report on Patentability—PCT/US07/074267—European Patent Office—Berlin—Nov. 19, 2008.

* cited by examiner

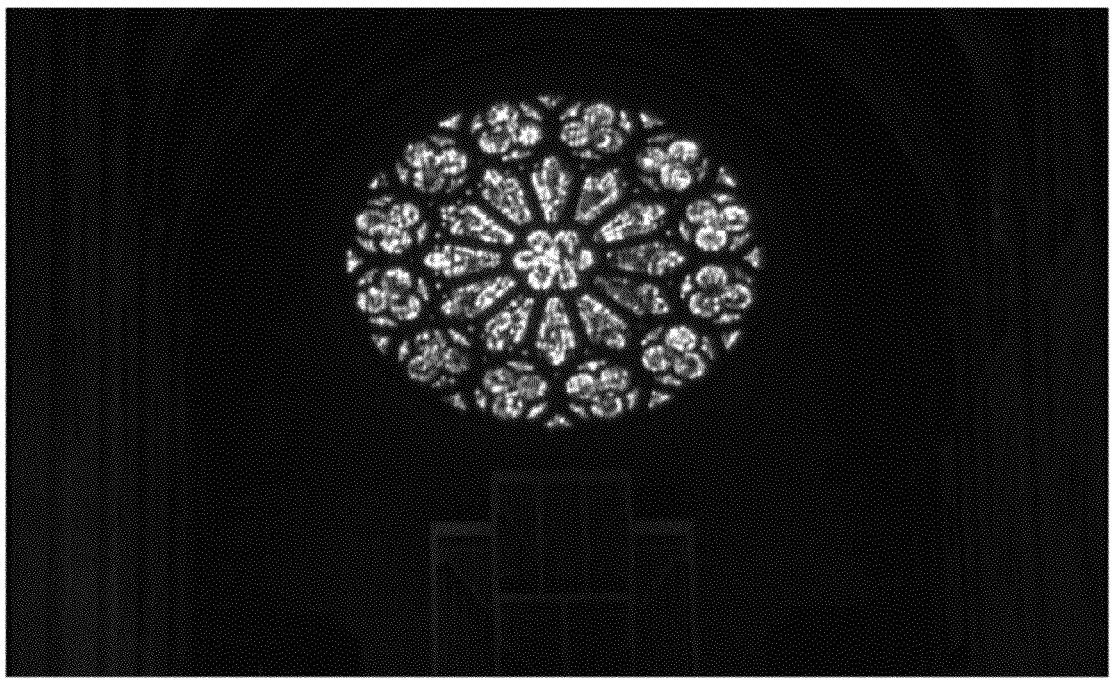
FIG. 3A
FIG. 3B
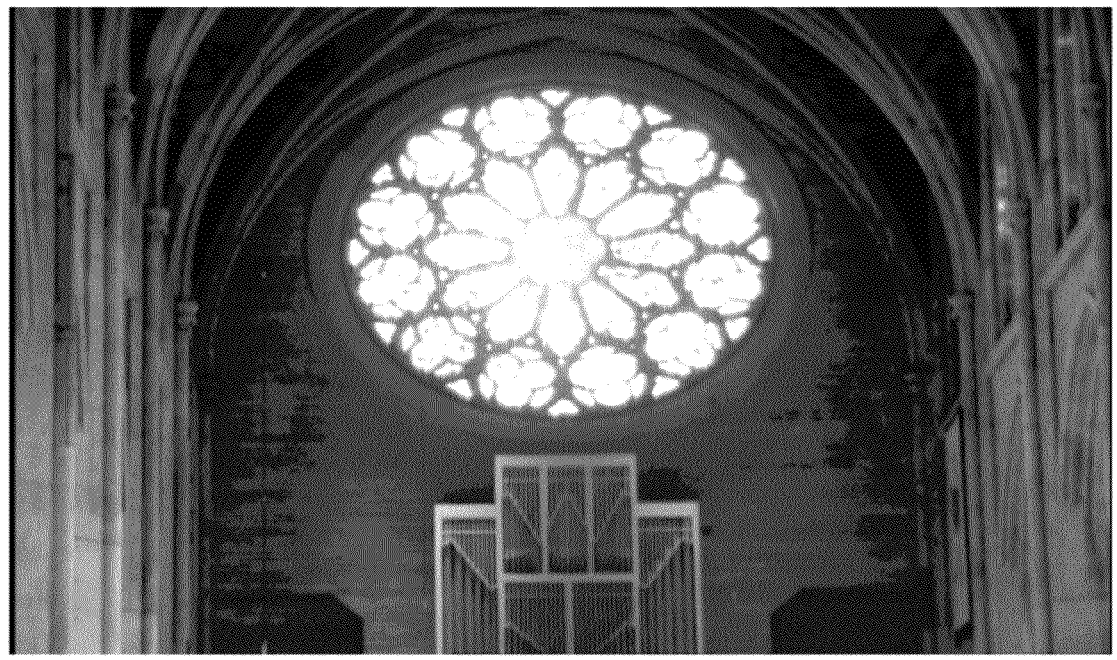

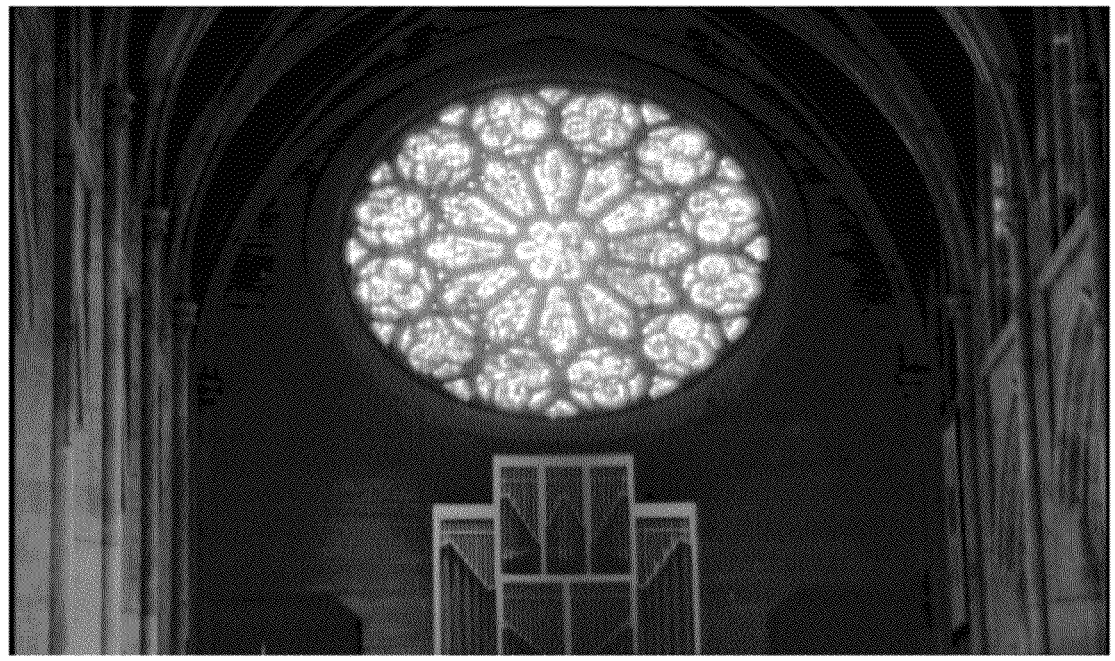
FIG. 3C
FIG. 4A

FIG. 4B
FIG. 4C
FIG. 4D
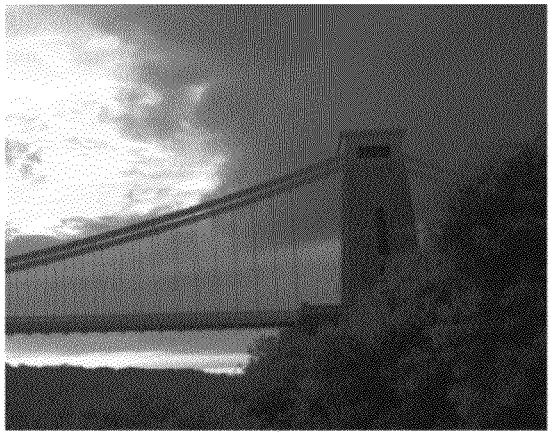
FIG. 4E
FIG. 4F

 
FIG. 5A  FIG. 5B
FIG. 5C

MOBILE DEVICE WITH DUAL DIGITAL CAMERA SENSORS AND METHODS OF USING THE SAME

TECHNICAL FIELD

The present application relates to mobile devices, and more particularly, to a mobile device with dual digital camera sensors and methods of using the same.

BACKGROUND

Some mobile devices, such as cellular phones, may have sensors to capture images.

SUMMARY

One aspect relates to an apparatus comprising: a first image sensor; a second image sensor configured to change position with respect to the first image sensor; a controller configured to control the position of the second image sensor; and an image processing module configured to process and combine images captured by the first and second image sensors.

Another aspect relates to a method comprising: adjusting a position of a second image sensor with respect to a first image sensor; receiving images from the first and second image sensors; and processing and combining images captured by the first and second image sensors.

The details of one or more embodiments are set forth in the accompanying drawings and the description below.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIG. 3A illustrates an example of a short exposure time image captured by a first sensor.

FIG. 3B illustrates an example of a long exposure time image captured by a second sensor.

FIG. 3C illustrates an example of a combined image from FIGS. 3A and 3B with dynamic range improvement.

FIG. 4A illustrates an image captured by the first sensor at zero degree rotation.

FIG. 4B illustrates an image captured by the first sensor at a −15-degree rotation.

FIG. 4C illustrates an image captured by the second sensor at a 15-degree rotation.

FIG. 4D illustrates an image captured by the first sensor at a −30-degree rotation.

FIG. 4E illustrates an image captured by the second sensor at a 30-degree rotation.

FIG. 4F illustrates a stereo image generated from combined images of the first and second sensors.

FIG. 5A illustrates an example of one sensor focusing on a near end or closer object.

FIG. 5B illustrates an example of one sensor focusing on a far end or farther object.

FIG. 5C illustrates an example of a stereo complete focused combined image from FIGS. 5A and 5B.

DETAILED DESCRIPTION

There may be a number of issues related to a device with dual sensors, such as computational complexity of increased data processing, power consumption, location, and resolution settings for these sensors. A device, such as a camera phone, may have two image sensors at fixed locations, i.e., the two sensors cannot be moved. The two sensors may be configured or treated differently, such as a primary sensor and a secondary sensor with different resolutions. A low resolution sensor may be used to capture videos, while a high resolution sensor may be used to capture still images. Images taken from the two sensors may not be combined. This device may not be able to support advanced applications as described below.

Device with Two Sensors, where at Least One Sensor is Movable

Figure 1:
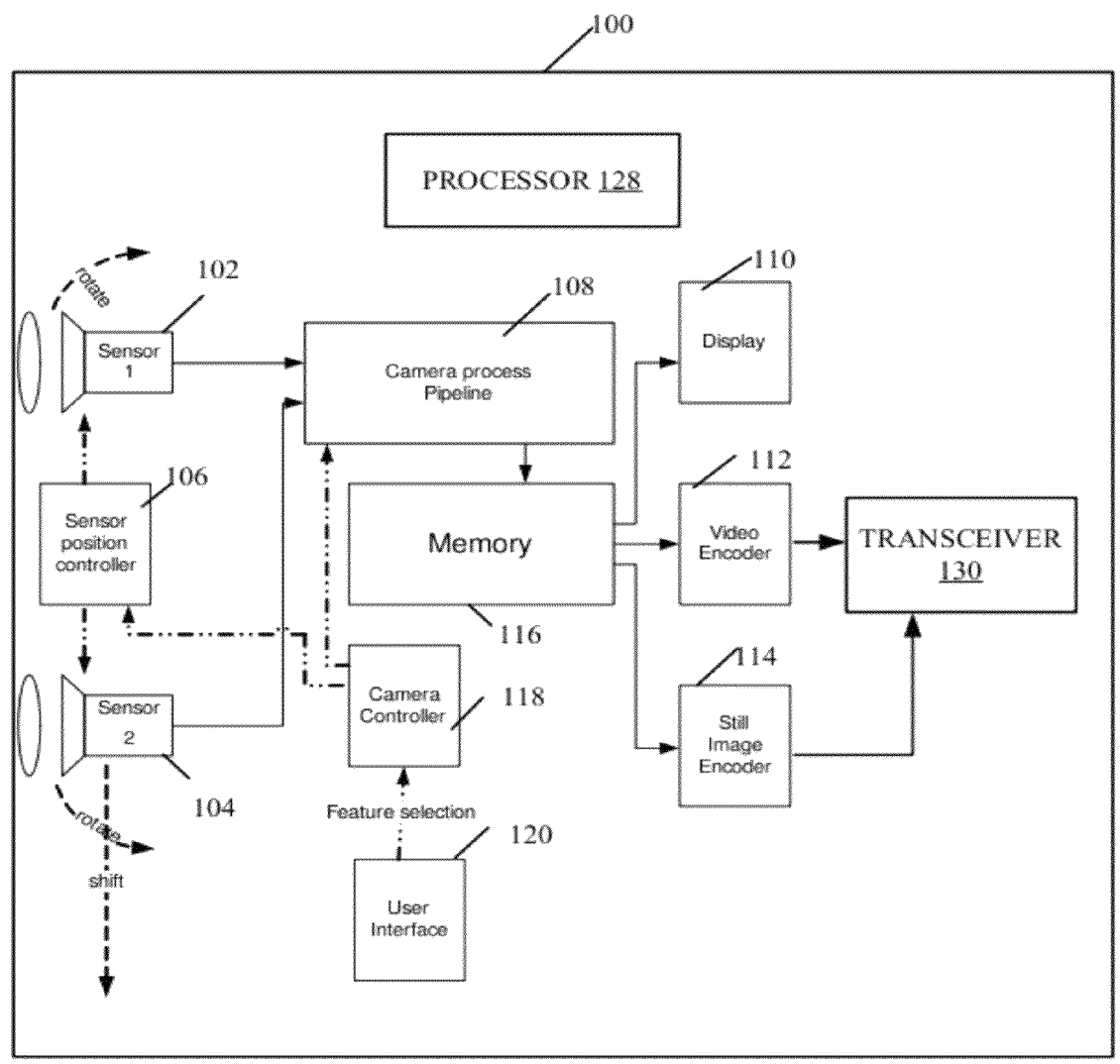
FIG. 1 illustrates a mobile device with two or more camera sensors.

FIG. 1 illustrates a mobile device 100 with two or more sensors 102, 104. The mobile device 100 may be configured to capture, create, process, modify, scale, encode, decode, transmit, store, and display digital images and/or video sequences. The mobile device 100 may represent or be implemented in a device, such as a wireless communication device, a personal digital assistant (PDA), a laptop computer, a desktop computer, a digital camera, a digital recording device, a network-enabled digital television, a mobile phone, a cellular phone, a satellite telephone, a camera phone, a terrestrial-based radiotelephone, a direct two-way communication device (sometimes referred to as a "walkie-talkie"), etc.

The mobile device 100 may include a first sensor 102, a second sensor 104, a sensor position controller 106, a camera process pipeline 108, a display 110, a video encoder 112, a still image encoder 114, a memory 116, a camera controller 118, a user interface 120, a processor 128 and a transceiver 130. In addition to or instead of the components shown in FIG. 1, the mobile device 100 may include other components. The architecture illustrated in FIG. 1 is merely an example. The features and techniques described herein may be implemented with a variety of other architectures.

The sensors 102, 104 may be digital camera sensors. The sensors 102, 104 may capture still image snapshots and/or video sequences. Each sensor may include color filter arrays (CFAs) arranged on a surface of individual sensors or sensor elements.

The memory 116 may store images or video sequences before and after processing. The memory 116 may include volatile storage and non-volatile storage. The memory 116 may comprise any type of data storage means, such as dynamic random access memory (DRAM), FLASH memory, NOR or NAND gate memory, or any other data storage technology.

The camera process pipeline 108 (also called an engine, module, processing unit, etc.) may comprise a chip set for a mobile phone, which may include hardware, software, firmware, and/or one or more microprocessors, digital signal processors (DSPs), application specific integrated circuits (ASICs), field programmable gate arrays (FPGAs), or various combinations thereof. The camera process pipeline 108 may perform one or more image processing techniques to improve quality of an image and/or a video sequence. For example, the pipeline 108 may perform techniques such as demosaicing, lens rolloff correction, scaling, color correction, color conversion, and spatial filtering. The pipeline 108 may also perform other techniques.

The video encoder 112 may comprise an encoder/decoder (CODEC) for encoding (or compressing) and decoding (or decompressing) digital video data.

The still image encoder 114 may comprise an encoder/decoder (CODEC) for encoding (or compressing) and decoding (or decompressing) image data.

The transceiver 130 may receive and/or transmit coded images or video sequences to another device or a network.

The transceiver 130 may use a wireless communication standard such as code division multiple access (CDMA). Examples of CDMA standards include CDMA 1x Evolution Data Optimized (EV-DO), Wideband CDMA (WCDMA), etc.

More Details on Sensors

Designs and features of the mobile device 100 with two separate sensors 102, 104 are described below. The sensors 102, 104 may have two aspects. First, the sensor position controller 106 may adjust locations and/or positions of the two sensors 102, 104, such as rotating, shifting or sliding the sensors 102, 104 in one or more directions. Some examples of movement are shown in FIG. 1, but other 2-dimensional (2-D) or 3-dimensional (3-D) movements may be implemented. The movements may be set by a user and/or by the camera controller 118. Adjustable sensors 102, 104 may enable a number of advanced features, such as image quality improvement, 3-D image and video visualization, and 360-degree panoramic video generation.

The movements may be fixed for a period of time or alternate with a frequency. In one configuration, the device 100 comprises more than two sensors, where the sensors are arranged in line, a triangle, a circle or some other pattern. In this configuration, the device 100 may activate certain sensors and deactivate other sensors without moving any sensor. This configuration may avoid issues that arise from moving sensors.

Second, various settings of the sensors 102, 104, such as resolution, may be adjustable to enable more advanced features and/or image processing applications. The dual sensors 102, 104 may improve image processing flexibility of the mobile device 100.

Figure 2:
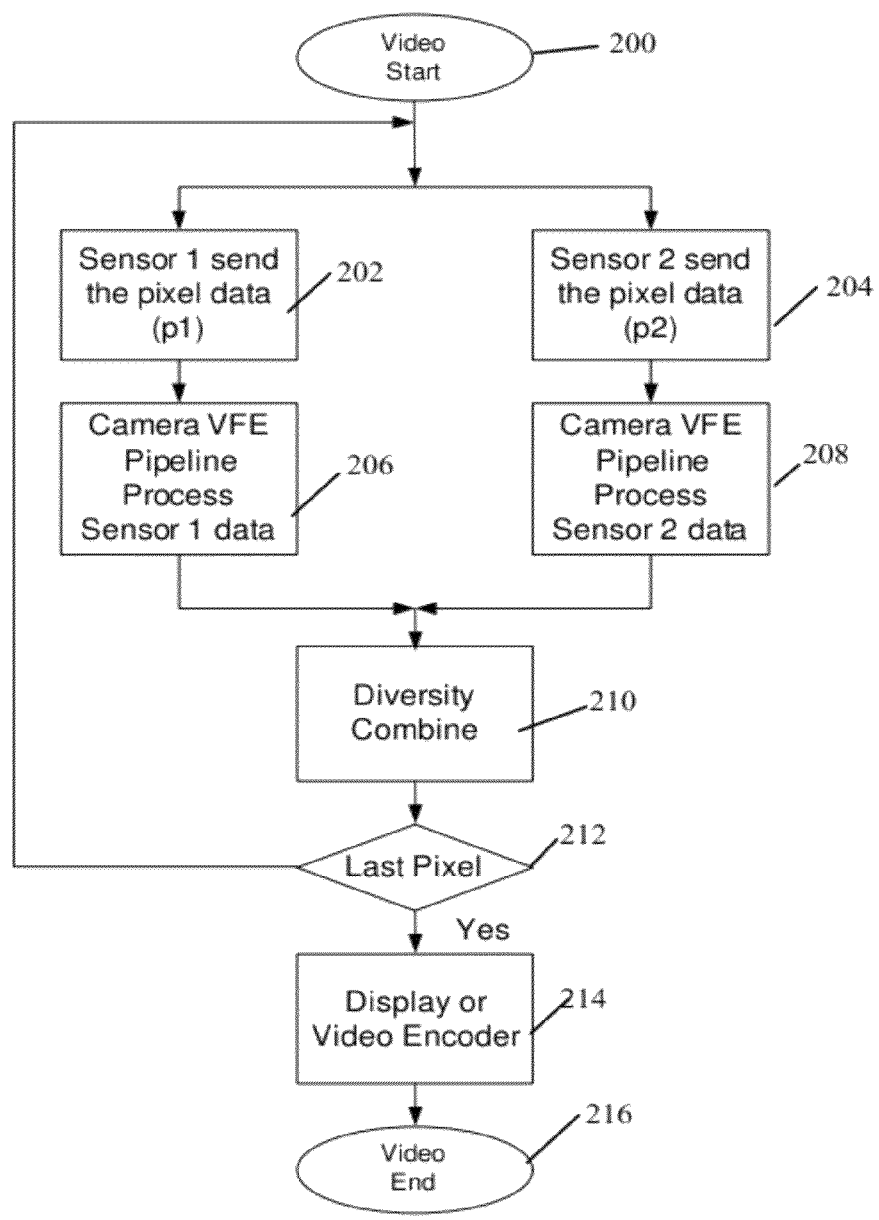
FIG. 2 illustrates a method of video mode processing using the device of FIG. 1.

FIG. 2 illustrates a method of video mode processing using the device 100 of FIG. 1. In blocks 202 and 204, the sensors 102, 104 capture images and send pixel data to the camera process pipeline 108, which may be implemented in or combined with a video front end (VFE). In blocks 206 and 208, the camera process pipeline 108 processes the pixel data. For example, the camera process pipeline 108 may improve image quality by adjusting color, scaling size, and enhancing image contrast.

In block 210, the camera process pipeline 108 may combine (or stitch) the processed, captured images from the two sensors 102, 104. The combined image may be saved in the memory 116 for display by the display 110 and/or still image and/or video encoding by the encoders 112, 114 (block 214). A decision block 212 determines whether there is more pixel data to capture and process.

The two sensors 102, 104 may provide one or more advantages. First, an observer's viewing angles may be controllable by adjusting the sensor positions. Second, the input images from two sensors 102, 104 may be jointly processed and composed. Third, a horizontal distance between the two sensors 102, 104 may be adjustable. One or more of these advantages may increase flexibility and capability to support a wide range of advanced features.

Techniques described herein may be dependent on sensor position settings and control configurations for specific applications. For low power consumption profiles, the second sensor 104 may be turned off, and a camera pipeline driven clock can be reduced.

Adjustable Sensor Locations

There may be three positions or locations of the sensors 102, 104, which may provide flexibility and enable advanced features.

The two sensors 102, 104 may be positioned very close to each other. Captured image and/or video quality may be greatly enhanced when the two sensors 102, 104 are targeting substantially the same view port, i.e., when theoretically the distance between the two sensors 102, 104 approaches zero. An adjustment algorithm may be used to shift the captured images to merge them into one.

Random image noise may be a problem, especially for a low light environment. Receive diversity with two sensors 102, 104 may be a good solution to reduce sensor noise without constraint of exposure time or overlapped image blurring due to time diversity. The two sensors 102, 104 may be placed close together to reduce a difference between captured scenes of the two sensors 102, 104. Sensor noise distribution may be independent and have the same variances. After combining two processed images from the two sensors 102, 104, the signal to noise ratio (SNR) may be calculated as follows:

$$SNR = 10\log\left(\frac{(S_1 + S_2)^2}{\text{var}(N_1) + \text{var}(N_2)}\right) \quad (1)$$

$$= 10\log\left(\frac{(2S_1)^2}{2\text{var}(N_1)}\right)$$

$$= 10\log\left(\frac{S_1^2}{\text{var}(N_1)}\right) + 3$$

where $S_1$ and $S_2$ are signals of the images captured from sensor 102 and sensor 104, and $\text{var}(N_1)$ and $\text{var}(N_2)$ are sensor noise image variances from sensor 102 and sensor 104, respectively. The SNR may be greatly improved by 3 decibels (dB) after combining the two sensors' image or video.

Image and Video Dynamic Range Enhancement

Sensor dynamic range may be an important issue for a low cost camera sensor. In order to increase image dynamic range, the exposure time of two sensors 102, 104 may be set to different values to capture a strong light scene and a low light scene, respectively. The two sensors 102, 104 may be placed closely to reduce a difference between scenes of the two sensors 102, 104. For example, the combined image dynamic range may be doubled if the exposure time of sensor 104 is two times the exposure time of sensor 102.

FIGS. 3A-3C illustrate an example of dynamic range improvement. FIG. 3A illustrates an example of a short exposure time image captured by the first sensor 102. FIG. 3B illustrates an example of a long exposure time image captured by the second sensor 104. FIG. 3C illustrates an example of a combined image from FIGS. 3A and 3B with dynamic range improvement.

Two Sensors Placed a Small Distance Apart

The device 100 may capture and generate stereo images and videos. When the sensors 102, 104 are placed at a distance of around 6 centimeters (cm) apart, the device 100 can capture a left eye view and a right eye view to simulate a human vision system, which has depth perception. 6 cm is approximately equal to the distance between a person's left eye and right eye. The captured images may be either composed to generate anaglyph image for a stereoscopic display or directly visualized in an autostereoscopic display.

Two Sensors Placed with Arbitrary Angle

The two sensors 102, 104 can be separated by an arbitrary angle in the range of 0 to 180 degrees. Therefore, the combined image can cover almost the whole 360 degree field of view (FOV) in any direction. This setting enables real time image stitching and 360-degree panoramic video applications, as shown in FIG. 4F.

FIG. 4A illustrates an image captured by the first sensor 102 at zero degree rotation. FIG. 4B illustrates an image captured by the first sensor 102 at a −15-degree rotation. FIG. 4C illustrates an image captured by the second sensor 104 at a 15-degree rotation. FIG. 4D illustrates an image captured by the first sensor 102 at a −30-degree rotation. FIG. 4E illustrates an image captured by the second sensor 104 at a 30-degree rotation. FIG. 4F illustrates a stereo image generated from combined images of the first and second sensors 102, 104. The image in FIG. 4F may look like a widescreen image.

Adjustable Sensor Settings

The device 100 may provide various combinations of sensor settings, such as lens focus, exposure, and white balance settings. For example, to make a resultant image be completely or almost completely focused for all scene objects, the device 100 can let one sensor 102 focus on a near end or object close to the viewer (FIG. 5A) and the other sensor 104 focus on a far end or object far from the viewer (FIG. 5B), or vice versa. FIG. 5C illustrates an example of a stereo complete focused combined image from FIGS. 5A and 5B. Exposure bracketing (series of photographs with different exposure settings, e.g., lighter or darker) is another example.

A mobile device with dual camera sensors is described herein. In the device, both setting and locations of the sensors may be adjustable. An intelligent feature-adaptive image combine engine may provide advanced features or applications, such as image quality improvement, 3-D image and video visualization, and 360-degree panoramic video generation.

Various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as limitations.

The various illustrative logical blocks, modules, and circuits described in connection with the aspects disclosed herein may be implemented or performed with a general purpose processor, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium. A storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Various modifications to the described aspects may be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. An electronic mobile device comprising:
    a first image sensor to capture a first image;
    a second image sensor to capture a second image;
    a controller coupled to the first image sensor and the second image sensor, the controller configured to move the second image sensor to a first horizontal distance and a second horizontal distance from the first image sensor; and
    an image processing module configured to increase the dynamic range of a scene by combining first and second images captured by the first and second image sensors at the first horizontal distance, and wherein the processing module is further configured to capture a stereoscopic image of a scene by combining first and second images captured by the first and second image sensors at the second horizontal distance.

2. The electronic mobile device of claim 1, wherein the first image sensor is configured to change location and the controller is further configured to control the location of the first image sensor.

3. The electronic mobile device of claim 1, wherein at least one of the first and second image sensors is configured to deactivate when the device enters a low power mode.

4. The electronic mobile device of claim 1, wherein the second image sensor is positioned at an angle with respect to the first image sensor in a range of 0 to 180 degrees.

5. The electronic mobile device of claim 1, wherein the image processing module is configured to perform real-time image stitching and a 360-degree panoramic video application.

6. The electronic mobile device of claim 1, wherein when the first image sensor is positioned proximate to the second image sensor so that a distance between the first image sensor and the second image sensor approaches zero, the first captured image and the second captured image are merged into a single image.

7. The electronic mobile device of claim 1, wherein when the first image sensor is positioned proximate to the second image sensor so that a distance between the first image sensor and the second image sensor approaches zero, the first image sensor and the second image sensor target substantially the same view port.

8. The electronic mobile device of claim 1, wherein the location of the second image sensor alternates with a frequency.

9. A method comprising:
    adjusting a location of a second image sensor in a mobile electronic device with respect to a first image sensor in the mobile electronic device using an electronic controller such that a distance between the second image sensor and the first image sensor changes, wherein the controller is coupled to the first image sensor and the second image sensor and wherein the location of the second image sensor alternates with a frequency, receiving a first image from the first image sensor and a second image from the second image sensor;

processing and combining the first image and the second to form a high dynamic range image;

receiving a third image from the first image sensor and a fourth image from the second image sensor when the first image sensor and the second image sensor are at a second horizontal distance apart; and processing and combining the third image and the fourth image when the first image sensor and the second image sensor are at a second horizontal distance apart-to create a stereoscopic image.

10. The method of claim 9, further comprising deactivating at least one of the first and second image sensors.

11. The method of claim 9, further comprising positioning the second image sensor at an angle with respect to the first image sensor in a range of 0 to 180 degrees.

12. The method of claim 11, further comprising performing real-time image stitching for a 360-degree panoramic video application.

13. The method of claim 9, wherein the first image is captured substantially concurrently with the second image, and wherein an exposure time of the first captured image is substantially equal to an exposure time of the second captured image.

14. The method of claim 9, wherein when the first image sensor is positioned proximate to the second image sensor so that a distance between the first image sensor and the second image sensor approaches zero, the first image sensor and the second image sensor target substantially the same view port.

15. An electronic mobile device comprising:

first means for image capture within the electronic mobile device;

second means for image capture within the electronic mobile device, wherein the second means for image capture is disposed a first distance from the first means for image capture, the second means for image capture configured to change location with respect to the first means for image capture; such that the second means for image capture is disposed a second distance from the first means for image capture, wherein the first distance is different from the second distance, and wherein the location of the second image sensor alternates with a frequency;

means for controlling the change in location of the second means for image capture with respect to the first means for image capture; and means for processing and combining a first image captured by the first means for image capture and a second image captured by the second means for image capture in the electronic mobile device.

16. The device of claim 15, wherein the first means for image capture is configured to change location and the means for controlling is further configured to control the location of the first means for image capture.

17. The device of claim 15, further comprising means for real-time image stitching in a 360-degree panoramic video application.

18. The device of claim 15, wherein when the first image sensor is positioned proximate to the second image sensor so that a distance between the first image sensor and the second image sensor approaches zero, the first captured image and the second captured image are merged into a single image.

19. The device of claim 15, wherein when the first image sensor is positioned proximate to the second image sensor so that a distance between the first image sensor and the second image sensor approaches zero, the first image sensor and the second image sensor target substantially the same view port.

20. The device of claim 15, wherein the means for processing and combining images increases the captured dynamic range of a scene.

21. The device of claim 15, wherein the means for processing and combining images creates stereoscopic images.

22. A non-transitory computer readable-medium comprising instructions, which when executed by a processor in an electronic mobile device, cause the processor to:

adjust a location of a second image sensor in the electronic mobile device with respect to a first image sensor in the electronic mobile device using an electronic controller in the electronic mobile device such that a distance between the second image sensor and the first image sensor changes, wherein the controller is coupled to the first image sensor and the second image sensor, and wherein the location of the second image sensor alternates with a frequency, receive a first image from the first image sensor and a second image from the second image sensor; and process and combine the first and second images.

23. The computer readable-medium of claim 22, further comprising instructions executable by the processor to cause the processor to change a second location of the first image sensor.

24. The computer readable-medium of claim 22, further comprising instructions executable by the processor to cause the processor to perform real-time image stitching for a 360-degree panoramic video application.

25. The computer readable-medium of claim 22, wherein when the first image sensor is positioned proximate to the second image sensor so that a distance between the first image sensor and the second image sensor approaches zero, the first captured image and the second captured image are merged into a single image.

26. The computer readable-medium of claim 22, wherein when the first image sensor is positioned proximate to the second image sensor so that a distance between the first image sensor and the second image sensor approaches zero, the first image sensor and the second image sensor target substantially the same view port.

27. The computer readable medium of claim 22, wherein the captured images are processed and combined to improve the dynamic range of a scene when the second image sensor is at a first location.

28. The computer readable medium of claim 22, wherein the captured images are processed and combined to create a stereoscopic image.

* * * * *